(12) United States Patent
Marino et al.

(10) Patent No.: US 6,311,428 B1
(45) Date of Patent: Nov. 6, 2001

(54) GARDEN TRELLIS WALL SYSTEM

(75) Inventors: Jeffrey R. Marino, Fishkill; Anthony G. Topping, Carmel, both of NY (US)

(73) Assignee: Vegherb, LLC, Carmel, NY (US)

( * ) Notice: Subject to any disclaimer, the term of this patent is extended or adjusted under 35 U.S.C. 154(b) by 0 days.

(21) Appl. No.: 09/229,417

(22) Filed: Jan. 12, 1999

(51) Int. Cl.$^7$ .................................................... A01G 17/06
(52) U.S. Cl. ................................................. 47/46; 256/65
(58) Field of Search ............................. 5/234; 47/43, 45, 47/46; 256/65, 73

(56) References Cited

U.S. PATENT DOCUMENTS

| | | | | |
|---|---|---|---|---|
| 72,120 | * | 12/1867 | Thompson | 256/73 |
| 274,925 | * | 4/1883 | Fitch | 5/234 |
| 4,145,031 | * | 3/1979 | Baker, II | 256/65 |
| 4,301,618 | * | 11/1981 | August | 47/46 |
| 4,870,781 | * | 10/1989 | Jones | 47/43 |
| 5,647,166 | * | 7/1997 | Neff | 47/45 |
| 5,711,107 | * | 1/1998 | Louisiana | 47/45 |

* cited by examiner

*Primary Examiner*—Charles T. Jordan
*Assistant Examiner*—Francis T. Palo
(74) *Attorney, Agent, or Firm*—Lilling & Lilling P.C.

(57) ABSTRACT

The invention provides a simple device for providing vertical support of vegetable plants, thereby eliminating the conventional problems routinely associated with home gardening. In particular, the device provides a maintenance free, vertical support frame assembly of adjustable height to which is attached a mesh netting and supporting stakes, forming an extendable garden trellis. Growing plants may be attached to the gardening trellis, thereby allowing maximum upward growth of the plants while also elevating the plants.

14 Claims, 6 Drawing Sheets

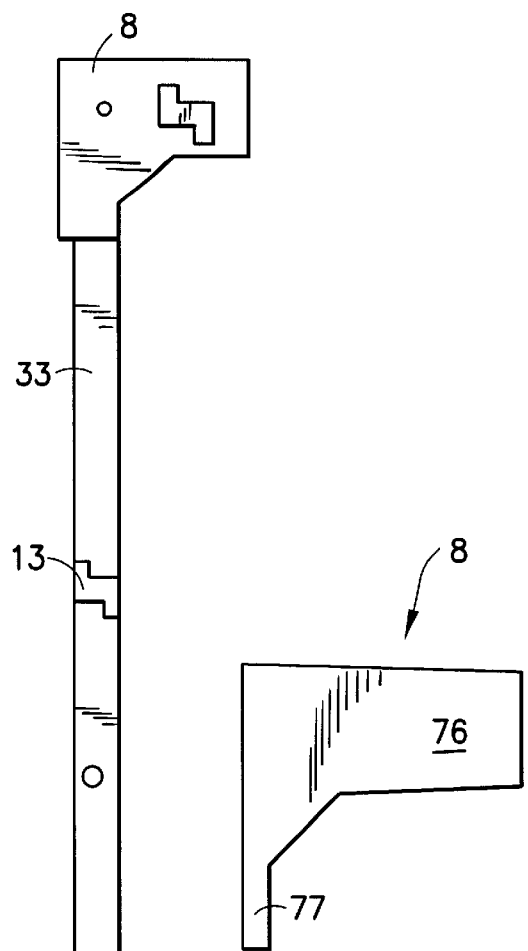
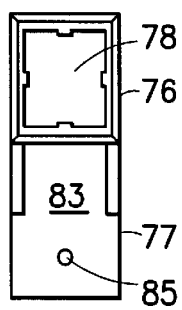
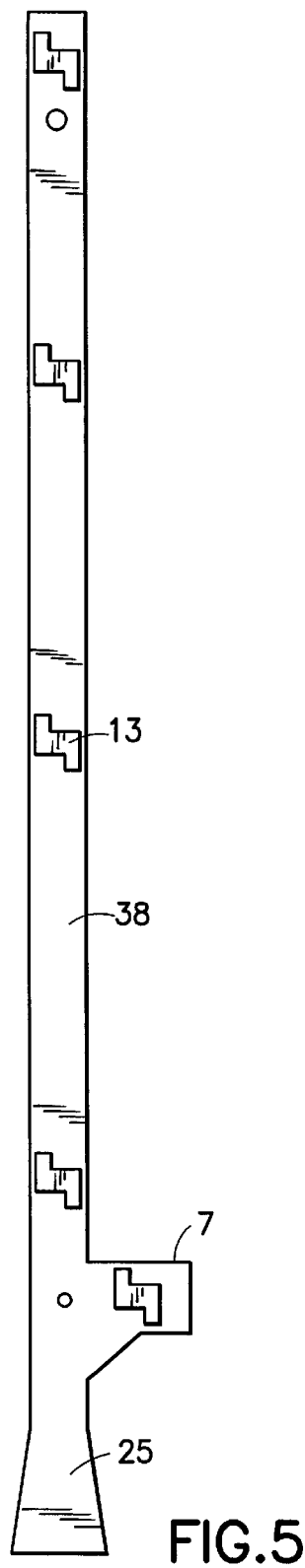
FIG.4  FIG.9  FIG.10  FIG.5

GARDEN TRELLIS WALL SYSTEM

FIELD OF THE INVENTION

This inventions relates to the home gardening industry and, in particular, to a device for vertical suspension of vegetables and other plants above the ground.

BACKGROUND OF THE INVENTION

Garden vegetables and fruits can produce much higher yields when they are allowed to reach the plants' maximum height. For example, tomatoes, cucumbers, pole beans, squashes and many other vegetables may grow up to heights exceeding 8–10 feet and, in turn, will produce fruit proportionally. Although support devices for garden vegetables are well known, current devices in the market do not provide the area to support plants to this height, nor can these devices typically accommodate multiple plants on the same support device. Many support devices in the market place are not taller than six feet and do not enable the user to adjust the height of the device according to the desired type of plant or specific individual plant and vegetable needs. In addition, current gardening support devices generally lack the structural strength to support plants exceeding five feet in height.

Frequently, support devices and garden trellises are made of wood and, in turn, are fastened to the ground using wood stakes. Although treated, these wooden support devices are not fully weather-proof and thus are often subject to rot and excessive wear or splitting over a period of time. Such rot is most often found near the lower end of the wood support or about the stakes due to constant exposure to ground moisture. As a result, such support devices will become out of line, tilt or even break due to winds and/or the weight of the plants.

For many years, people have been growing vegetables in outdoor gardens at the front, side and rear yards of their homes. A persistent problem with garden vegetables is that the plants take up a substantial amount of outdoor space. Such space requirements are inconvenient and prevent those living in areas with limited yard space from enjoying their own home-grown vegetables. Further, the failure to maximize the growth potential in a limited outdoor garden results in a reduced yield of vegetables.

Another difficulty with the growing of vegetables is that, as the plants grow up and outward, there is the possibility that plants will limit the exposure of sunlight to leaves and stems growing below. This is especially true where numerous different vegetables are placed in the same garden area, each growing at a different rate and competing for maximum exposure to daily available sunlight. Thus, there is a need in the marketplace for a device which allows various plants of different sizes to achieve maximum exposure to available sunlight without extensive use of gardening space.

In order to be successful, vegetable gardens must be kept free from insects and small animal pests. Considerable time and expense must be incurred using pesticides and other means to maintain a healthy garden free from the damaging effects of insects and small animal pests. The risk of insects and pest damage is even greater when trying to grow plants which produce vegetables on or close to the ground. Such a position of the vegetables provides easier access for the many non-flying insects and land borne animals which feed on plants and vegetables. Further, even with proper care, plant and vegetable damage from such pests may occur at any time during the plants' life. Therefore, there is always a need in the home gardening industry for new and inventive methods for decreasing the risk of plant damage, especially without the use of environmentally harmful pesticides and animal repellents.

In addition to the risk of insects and small animal pests, significant time and expense must be expended to keep a vegetable garden free of weeds. Many back breaking hours may be spent throughout the growing season picking weeds that continuously plague a garden. Failure to regularly maintain a garden free of weeds will decrease the health and productivity of the plants. Weed growth within the garden may also increase the chance of insect infection. The greater the size of the garden, typically the greater the area of soil which must be continually weeded, both manually and with pesticides, in order to maximize plant growth.

Therefore, there is a need in the market place for a durable, space efficient, adjustable support device that enables a user to grow various forms of vegetables, while in turn decreasing the time and expense to keep a garden healthy, but yet maximizing available sunlight and producing optimum yield within a reduced area.

SUMMARY OF THE INVENTION

It is the object of this invention to provide an adjustable support device for the growing of vegetables which allows the plants to reach their maximum height and thereby produce the greatest amount of produce. The invention comprises a trellis having a frame assembly over which netting is spread to support plant stems and fruit. The trellis is anchored in and above the ground by stabilizing stakes upon which the trellis frame rests. Further, the frame assembly of the trellis has an upper portion and a lower portion, which allows the height of the frame to be freely adjustable along the vertical axis of the trellis and perpendicular to the ground. The netting is fabricated from strong plastic stretched across and attached to the frame. Further, the netting may also be adjusted according to the desired height of the trellis. As a result, the invention provides a simple to use, durable and adjustable garden support device which allows plants to grow upward, thereby maximizing available soil and ground space and providing ideal exposure to sunlight. Upward growth also allows the plant to remain supported above the ground, thereby eliminating the risk of ground rot and greatly reducing the threat of land borne insects. In addition, by guiding garden vegetables to grow upward, rather than along the ground, the adjustable trellis promotes high efficiency gardening that reduces the amount of space needed to grow vegetables and decreases the ground area which must be weeded and fertilized in order to insure the health of the plant.

The present invention may also be employed side by side or in a saw-tooth pattern. It is a further object of the present invention to allow one individual extendable trellis, once installed, to be expanded by using one or more extension kits. The extension kit allows addition sections to be added to the existing garden trellis system, utilizing one common side rail for the two units. In this regard, any number of individual extendable trellises may be connected using an extension kit to form any number of patterns, depending on the desired use or available area. The extension kit comprises two cross pieces, a support netting and a single upper side rail and lower side rail with stake. Two brackets are supplied to secure the cross pieces to a side rail of the existing garden trellis. The extension kit may be attached at any one of six locations on the existing trellis to provide a wide variety of design options for the user. Additional extension kits may be attached to existing extension kits, thereby providing for infinite design flexibility. As a result, the invention provides a more economical solution to the gardener who wants to increase their vertical growing space and allows for a more streamlined appearance than multiple individual units.

Other objects, features and advantages of the invention shall become apparent as the description thereof proceeds when considered in connection with the accompanying illustrative drawings.

BRIEF DESCRIPTION OF THE DRAWINGS

FIG. 4 is a side view of an upper side rail.

FIG. 5 is a side view of a lower side rail.

FIG. 9 is a side view of the free standing bracket of the extension kit.

FIG. 10 is a front view of the free standing bracket of the extension kit.

DETAILED DESCRIPTION OF THE INVENTION

Figure 1:
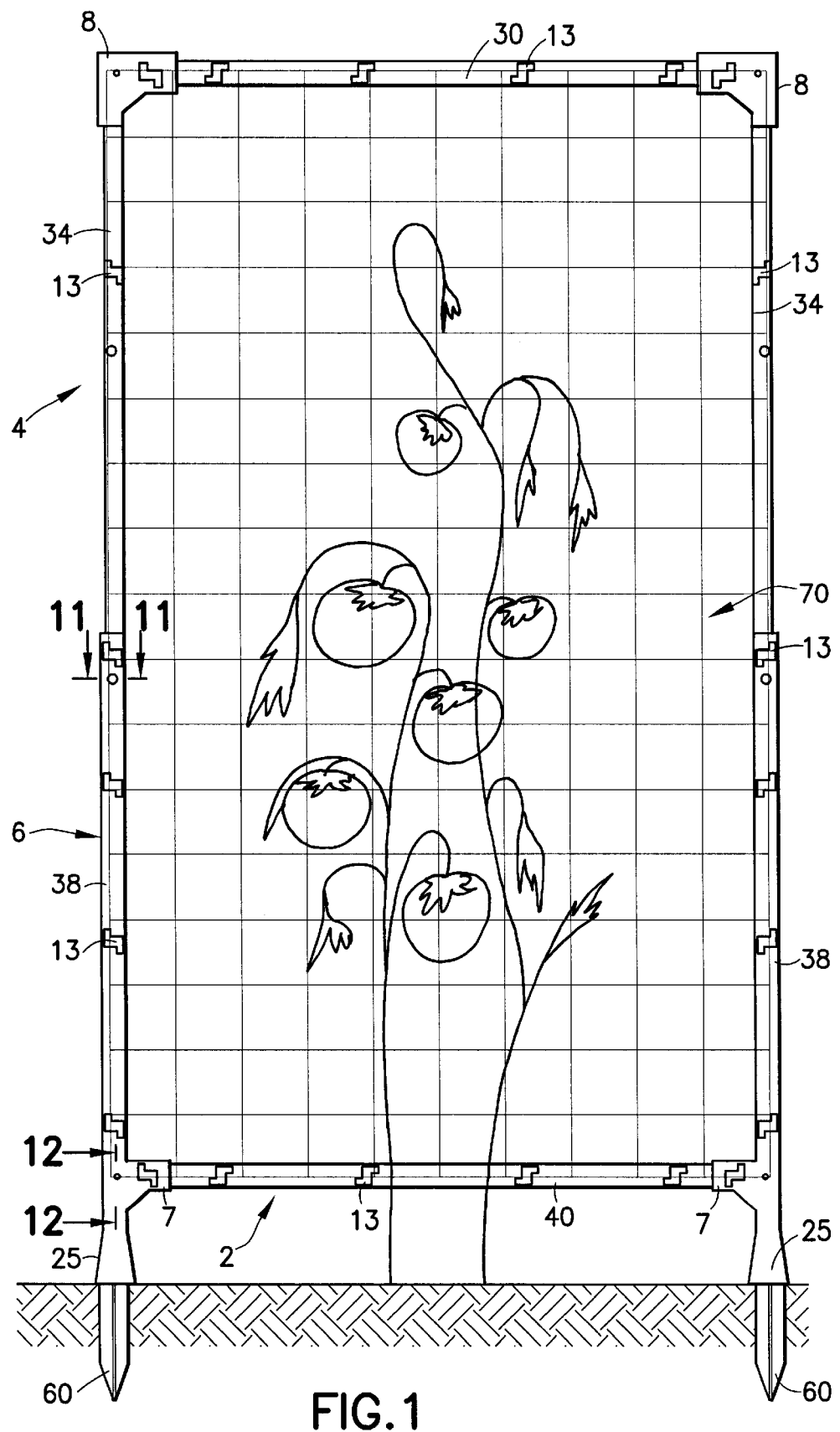
FIG. 1 is a front view of the garden trellis wall system with mesh netting.
Figure 2:
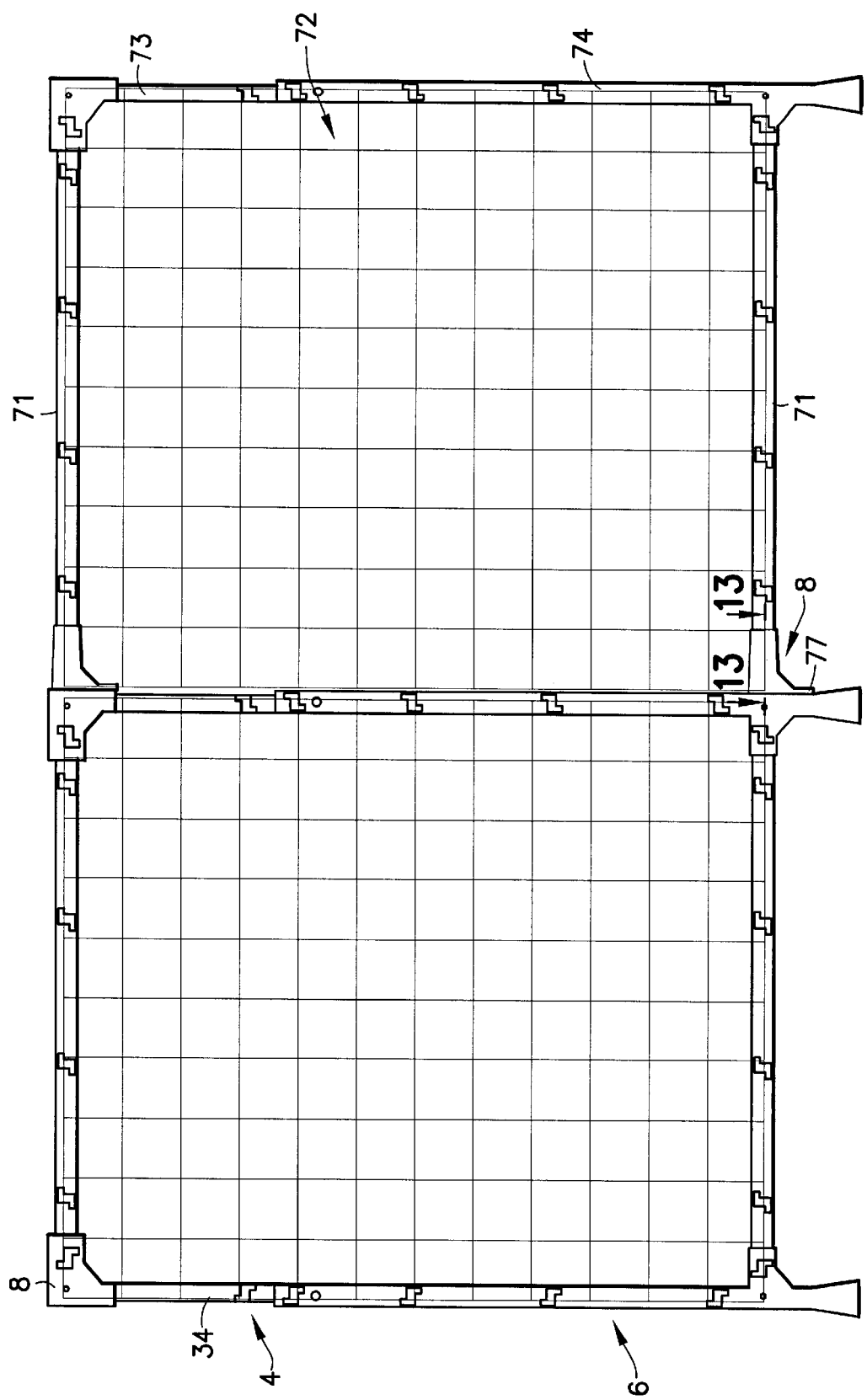
FIG. 2 is a front view of the garden trellis wall system with an extension piece.

In its simplest embodiment the invention consists of a frame assembly having an upper section 4 and a lower section 6 interconnected in telescoping fashion, such as to provide a simple but durable means for adjusting the height of the extendable trellis.

In the preferred embodiment, the upper section 4 comprises two identical upper side rails 34, connected to an upper cross piece 30.

Each upper side rail is C-shaped defining a channel along its vertical axis, has a top portion 33, a bottom portion 35 and is of the similar shape and configuration along its entire length. In the preferred embodiment, the length of each side rail is in the range of 3–6 feet, while the width is 0.5–2.0 inches, depending on the size and strength desired. Preferably, the upper side rails may be made from molded synthetic plastic. They may, however, be constructed from any light weight, rust resistant rigid material such as aluminum, fiberglass or galvanized metal.

The upper cross piece 30 is made of the same material and is equal in shape and width as each of the upper side rails 34, but may be of a reduced length when compared to the two upper side rails. In the preferred embodiment, the length is between 2–6 feet. At the distal ends of the upper cross piece 30, the top portion 33 of each side rail is perpendicularly fastened using a fastening means to form the upper section 4 of the extendable garden trellis, such that the resulting upper section is in the shape of a half rectangle or inverted "u." Each of the upper side rails is of identical construction, and for the sake of convenience, only one of the upper side rails will be described.

In the preferred embodiment, the fastening means is a molded fastening bracket 8 incorporated into the top portion 33 of the upper side rail. Thus the fastening bracket 8 and upper side rail are a single unit. The fastening bracket 8 of the upper side rail has a top leg 10 perpendicular to the vertical axis of the upper cross piece.

The top leg 10 of the fastening bracket 8 is in the shape of a square and defines a hollow center 14, which forms a continuous channel through the length of the top leg 10. Further, said top leg 10 has an outside surface 16 and an inside surface 18.

In operation, the distal ends 28 of the upper cross piece 30 are inserted into the hollow center 14 of the top leg 10 of each fastening bracket, so as to form a male/female connector, such that the upper cross piece 30 acts as the male component and the top leg 10 acts as the female component. Depending on the thickness of the upper cross piece, will depend the length and width of the hollow center 14 of the top leg 10. It is desirable, but not mandatory, that there be as little space as possible, so as to form a tight junction between the upper cross piece 30 and the top leg 10 of the fastening bracket 8

Located on the outside surface 16 of the top leg is an aperture 32 for stabilizing the upper cross piece 30 to the top leg 10. An attachment means is placed through the aperture 32 and into the upper cross piece 30, thereby fastening said upper cross piece to the upper side rail. In the preferred embodiment, a pre-sized pin is used, however, any rigid attachment means may be used such as a nail, threaded screw or rivet.

The lower section 6 comprises two identical lower side rails 38 connected to a lower cross piece 40.

Each lower side rail 38 is C-shaped, defining an interior channel 46 along its vertical axis, a top portion 42 and a bottom portion 44. In the preferred embodiment, the length of each side rail is 3–6 feet, while the width is 0.5–2.5 inches, depending on the size and strength desired. The lower side rails may be made from molded synthetic plastic. They may, however, be constructed from any light weight, rust resistant rigid material, such as aluminum, fiberglass or galvanized metal.

The lower cross piece 40 is made of the same material and is similar in shape and width as each of the lower side rails. Further, the lower cross piece 40 is of the same size, shape, configuration and length as the upper cross piece 30.

In an alternate embodiment, the upper and lower side rails may be made of telescoping and/or nesting tubes. Either the upper or lower side rails would be made of a slightly smaller diameter, so as to fit within the interior of the other corresponding side rail.

The bottom portion 44 of each lower side rail 38 is perpendicularly attached to the distal ends of the lower cross piece 40, using a fastening means to form the lower section 2 of the extendable trellis.

In the preferred embodiment, the fastening means are molded fastening brackets 7 incorporated into the bottom portion 44 of each lower side rail 38. As with the upper side rails, the fastening bracket and the lower side rail are molded into a single unit. Further, the fastening brackets 7 of the lower side rails attach the lower cross piece 40 to the two lower side rails 38 in the same form and fashion as described in regard to the upper cross piece and upper side rails.

Figure 3:
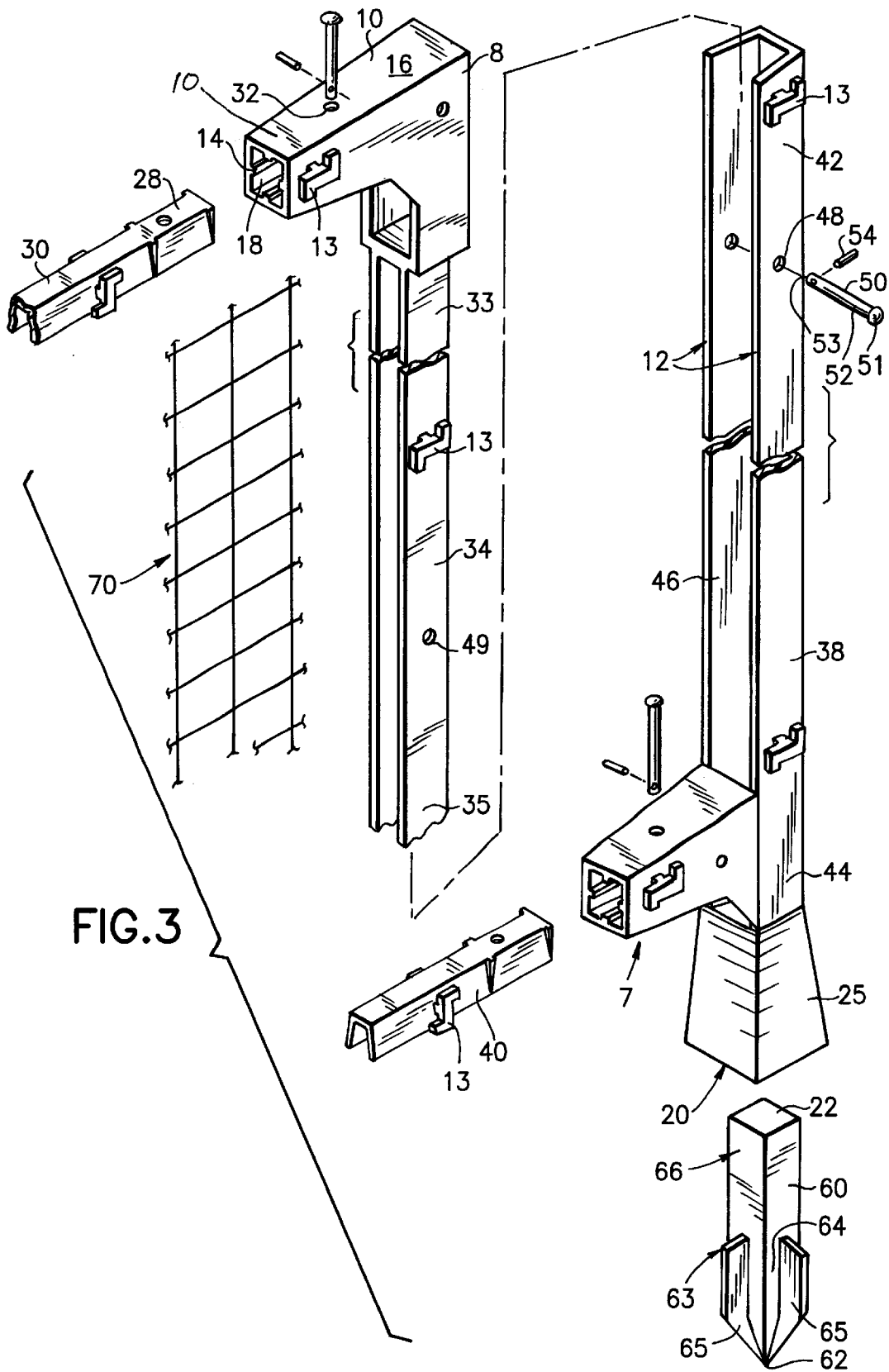
FIG. 3 is an exploded perspective view of the garden trellis wall system.

As best shown in FIG. 3, the interior channel 46 of each lower side rail has a uniform width of such size so that the upper side rails 34 of the upper portion may be inserted into the interior channel 46 of the lower side rails 38 in telescoping fashion, thereby allowing the upper side rails to slide up and down the interior channel 46 to form an adjustable frame assembly. Depending on the width of the upper side rail will depend the width of the interior channel 46. It is desirable that there be as little space as possible so as to securely fit the upper section into the lower section and avoid any swaying or tilting of the fabricated frame assembly. In this way, the upper and lower portions are joined to form an extendable frame, adjustable to provide any desired height.

In the preferred embodiment, the top portion 42 of each lower side rail 38 has a single aperture 48 through each rim 12 of the interior channel 46. In turn, the bottom portion 35 of each upper side rail 34 has a plurality of evenly spaced apertures 49 along the length and through each rim of the channel of the upper side rails. When the upper portion is inserted into the hollow channel 46 of the lower side rails 38 of the lower portion, the apertures of the lower and upper side rails will become aligned along various depths of insertion. A pin may then be inserted through the aligned apertures so as to securely fasten the upper portion to the lower portion. In this way, the height of the extendable frame may be adjusted depending on the alignment of the apertures of the lower and upper side rails and the degree of insertion.

Preferably, the pin is a clevis pin 50 having a head 51, stem 52 and tip 53. The head 52 consists of a domed top, flat bottom and is of a diameter of approximately twice the stem 52. The stem is of sufficient diameter so that said stem may be securely inserted through the apertures 48 and 49 of both the lower and upper side rails. Upon insertion, the tip 53 passes through the aligned apertures, such that the head 52 rests flush against the aperture 48 and said tip exits out the opposite end of said apertures. The tip 53 of the stem 52 contains an opening through which a cotter pin 54 may be placed to secure the clevis pin once inserted through the aligned apertures of the upper and lower side rails. In this way, the clevis pin is locked within the aperture unable to be removed until desired by the user. Thus, the upper section 4 is firmly attached to the lower section 6. In the alternative, friction locks or any other type of effective fastening means may be used in the place of the clevis pin to set the height of the extendable frame assembly.

In alternate arrangements, the garden trellis wall system may have any number of preset heights or may be infinitely adjustable up to the maximum height of the trellis as determined by the lengths of the side rails. Further, both smaller and larger versions of the extendable trellis may be created using the same extendable design and/or shape.

Two identical stakes 60 embedded into the ground are attached to the lower section, so as to vertically support the frame assembly perpendicular to the ground and anchor the extendable frame assembly securely to the ground surface. Each stake has an upper neck 66 containing a centrally located aperture, a body 64 defined by four fins 65 and a tapered tip 62. In operation, the stake 60 is driven into the ground tip first, such that only a small upper portion 63 of the fins 65 remain projecting above the ground surface, while the upper neck 66 remains completely above the ground. Once driven into the ground, the fins provide support and prevent the stake from rocking or becoming loose over time. In addition, the fins guide the stake into the ground in a straight up-right position.

The extendable frame is attached to the stakes 60 through male/female engagement of the upper neck 66 into a square leg 25 defining an interior 20 located at the bottom portion 44 of the lower side rails 38. Further, in some embodiments, the bottom portion 44 of the lower side rails may rest on the upper portion 63 of the fins. The top of the hollow interior 20 of the leg 25 rests upon the top 22 of the upper neck 66 of the stake.

In one embodiment, an aperture through the horizontal plane of the bottom portion of the lower side rails aligns with an aperture in the upper neck of the stake. In this way, a clevis pin may be placed through the aligned apertures, so as to further secure the extendable frame to the stakes. In the alternative, gravity, friction locks or other types of fasteners, such as screws, may be used in the place of the clevis pin to attach the extendable frame assembly to the stakes. In most cases, the force of gravity will be sufficient to hold the leg of the lower side rail securely on the stake. Further, the stakes may be incorporated into the bottom portion of the lower side rails to form a singular molded unit, such that the entire lower section may be driven into the ground as a unitary segment.

A mesh netting 70 is spread across the frame assembly perpendicular to the ground. The degree and density of the mesh will depend on the type and number of plants supported by the extendable frame assembly. In the preferred embodiment, the mesh netting 70 is attached to the frame assembly by coupling said mesh netting with netting clips 13 located about the frame assembly. However, any attachment means capable of tautly securing the mesh netting to the corners of the frame assembly may be used. Further, the mesh netting 70 may be fastened to the frame assembly at as many points as needed, by the use of wire ties, clips and/or other suitable fastening means wrapped about the mesh and the upper and lower side rails of the extendable frame assembly. In this way, the mesh netting may be spread tightly along the entire expanse of the frame assembly. Preferably, the mesh netting is made of polypropylene, however, any lightweight, strong, flexible material may be used.

Figure 6:
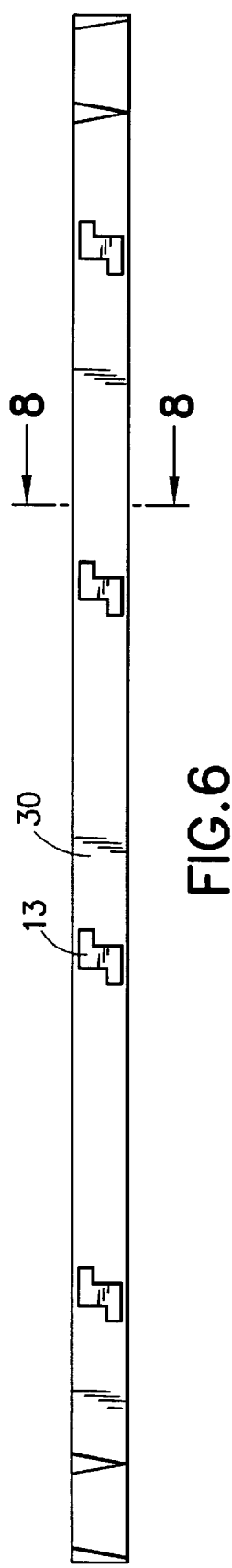
FIG. 6 is a side view of a cross piece.
Figure 8:
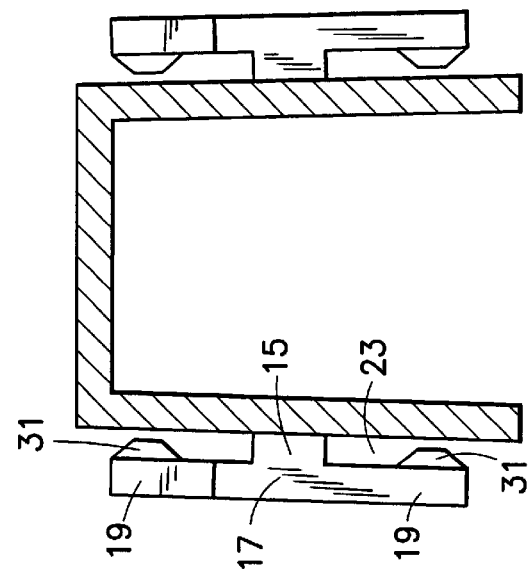
FIG. 8 is a cross section view along line 8—8 of FIG. 6.
Figure 7:
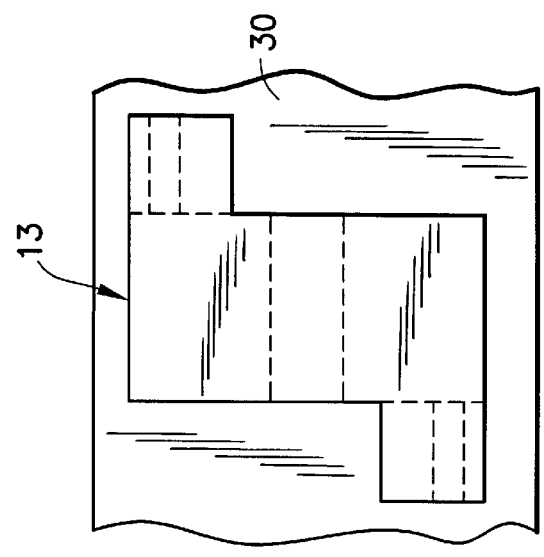
FIG. 7 is an enlarged, detail front view of a netting clip, as shown on the cross piece of FIG. 6.
Figure 11:
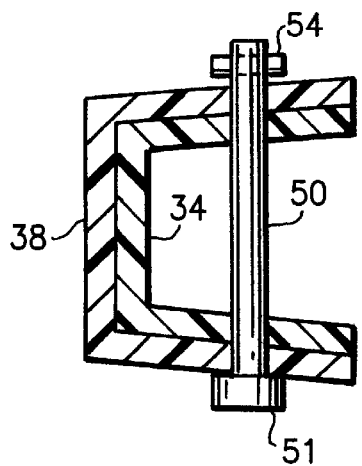
FIG. 11 is a cross section along line 11—11 of FIG. 1.
Figure 12:
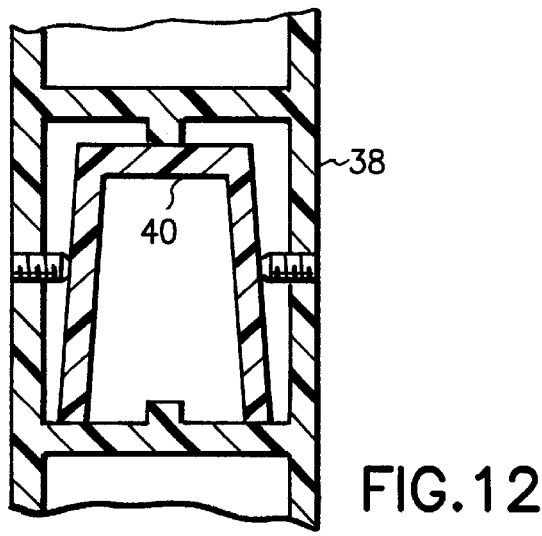
FIG. 12 is a cross section along line 12—12 of FIG. 1.
Figure 13:
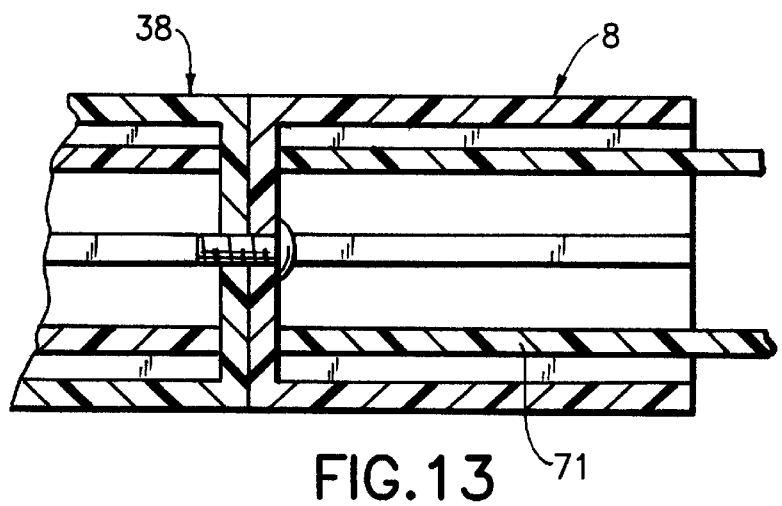
FIG. 13 is a cross section along line 13—13 of FIG. 2.

At various points about the frame assembly, a plurality of netting clips 13 may be positioned for attachment of the support netting. In the preferred embodiment, the netting clips 13 are incorporated into the plastic mold of the individual parts of the trellis frame components. FIG. 6 illustrates a plurality of netting clips positioned at various points about the face of the cross piece. The netting clips comprise a stem 15, a head 17, two arms 19 and two shoulders 31 located upon the arms. The stem 15 attaches the head 17 to the cross piece (or upper or lower side rail). The head 17 has two flexible arms 19 extending parallel to the trellis frame which are capable of lateral flexation perpendicular to the trellis frame. Each arm 19 has an inside portion facing the frame assembly. Between the inside portion of each arm 19 and the trellis frame, a channel with three sides and an open end is defined. A shoulder 31 extends outward from the inside portion of each arm 19. Lateral flexation of the arm(s) 19, in effect, increases or decreases the width of the channel opening. In operation, the mesh netting is "clipped" onto the netting clip 13 by placing the mesh netting in the channel. The arms 19 flexes outward as the mesh netting is placed into the channel and then returns into place once the netting is within the channel 23. The shoulders 31 decrease the channel opening so as to secure the mesh netting within the netting clip and thus to the assembled trellis frame. In this manner, the mesh netting may be quickly and easily secured to the frame assembly without the need for additional means to secure the mesh netting.

Variations of the extendable gardening trellis include using a lattice or network of bars rather than netting to support plant stems. Such variations may make the appearance of the trellis more ornate or better adapt the trellis to any form of specific application as desired by the user.

In use, the adjustable frame assembly with mesh netting forms an extendable gardening trellis which may be used to support plant stems and fruit. The mesh netting serves as a superior means of support because no tying or hooks are needed to support the plants. One can simply thread the plant through the openings in the mesh netting. In this way, less stress is placed on the plants while still providing needed support for optimum plant growth. Further, by eliminating the need to use thread or hooks to support the plants, there is less risk of damage and/or injury to the plant stems or cutting off the flow of plant fluid through the plant stem. The tedious and time consuming process of carefully tying up individual plant stems is also eliminated. Many times supporting plants by the use of thread or hooks may also reduce plant growth and/or fruit yield.

The gardening trellis provides the area and support to accommodate multiple plants on the same support device and is extendable to greater than six feet in height. The rigid construction and stability of the gardening trellis is able to truss larger plants than standard gardening devices currently in the market. As a result, plants are able to grow upward rather than sprawled along the ground, so as to reach maximum heights and produce much higher yields.

Experiments conducted during development of the present invention comprised using 21 extendable garden trellises in various gardening conditions and growing numerous vegetable plants such as tomatoes, cucumbers, pole beans, squashes, pumpkins and others. Soil conditions for the conventional gardens and those utilizing the extendable garden trellis were similar as was the use of water, fertilizer and pesticides. The result achieved was that plants grown in conjunction with the extendable garden trellis were able to effectively reach their maximum respective heights and produced higher yields as compared to the same vegetable plants in conventional gardens. In addition, common insect problems were minimized for the plants supported by the extendable garden trellis, thus reducing the need for chemical pesticides and producing a safer and healthier yield.

By inducing the growth of plants upward, the extendable gardening trellis allows the user to gain maximum efficiency within a limited area. In this way, the need for vast ground space to produce large effective gardens is eliminated and home gardening becomes more accessible to the general public. This is especially true of those living in urban environments who typically have limited access to yard space.

The extendable gardening trellis may be used either in line as a repeated unit, along a wall or fence, self standing or can be combined with similar units to form more complex arrangements. In line, the extendable gardening trellis units may be placed parallel to one another in row fashion either to separate various plant species or to maximize ground surface area. Different standing patterns may be created by connecting one extendable trellis with another trellis along the side rails. Such patterns can increase the aesthetic appearance of the trellis along with providing greater adaptability for the unique purposes of the individual user. In this way, plant species may be separated based on need while still providing a large area for growth and maintaining maximum exposure to sunlight. Further, the extendable gardening trellis may be placed along a wall or fence, thereby allowing plants to grow to large sizes while utilizing a very small amount of ground space. As a result, a small strip of open soil along a fence or wall may be effectively used to create a towering garden and sustain a large yield of fruit, while utilizing only a small amount of available soil area.

In an alternate embodiment, one or more extension kits may be included to expand the size of the garden trellis wall system. Incorporation of the extension kit allows the user to place additional trellis sections upon an existing and complete garden trellis system, utilizing one common upper and lower side rail for the two units. The extension kit comprises upper and lower cross pieces 71, mesh netting 72, a single upper side rail 73, a lower side rail 74 and a stake. Each of these elements are identical in size, shape and configuration as previously described for the garden trellis wall system. In addition, two separate fastening brackets are supplied to secure the two cross pieces to the existing, completed garden trellis.

In the preferred embodiment, the separate fastening bracket 8 has a top leg 76 and a bottom leg 77 which are perpendicularly attached. The separate fastening brackets are of identical construction, and for the sake of convenience, only one of the brackets will be described.

Preferably, as with the garden trellis wall system, the separate fastening brackets, and the entire extension kit, are made of a light rigid plastic such as acrylonitrile-butadiene-styrene copolymer, polyethylene, polyvinyl chloride, polycarbonate or styrene. They may, however, be made from any strong, sturdy and weather resistant material, such as aluminum, fiberglass or galvanized metal.

The top leg 76 of the fastening bracket is in the shape of a square and defines a hollow center 78, which forms a continuous channel through the length of the top leg 76.

The bottom leg 77 is flat to fit flush against the side rail of an existing, adjacent trellis.

In operation, the distal ends of the upper and lower cross pieces 71 are inserted into the hollow center 78 of the top leg 76 of the corresponding fastening bracket 8, so as to form a male/female connector, in similar fashion and function as described in the garden trellis wall system. A fastening means, such as a screw or pin, may be used to secure each cross piece securely within the top leg of the separate fastening bracket.

The upper cross pieces are then secured to the integrated upper and lower side rails in the same form and fashion as with the garden trellis system. The result, is a three sided frame assembly. The assembled extension kit is then placed against the complete garden trellis system. It is desirable, but not mandatory, that there be as little space as possible, so as to form a tight junction between the side rails and the bottom legs of the separate fastening brackets.

Located on the base 83 of the bottom leg 77 is an aperture 85 for stabilizing the side rails of the completed garden trellis to the bottom leg. An attachment means is placed through the aperture 85 and into the completed trellis, thereby fastening the extension kit to the completed garden trellis. In the preferred embodiment, a screw is used, however, any rigid attachment means may be used such as a nail, pin or rivet.

By allowing the plants to grow upward along the extendable garden trellis, rather than along the ground, the trellis reduces the threat of ground borne insects and ground rot to fruits and vegetables. In this way, the garden trellis reduces the time and expense of standard home gardening while increasing the yield of fruit and vegetables in which the garden may produce. Thus, home gardening becomes available to those with limited time or finances to enjoy the health benefits and enjoyment of at home gardening.

The two piece design of the extendable gardening trellis further allows the trellis to be easily dismantled and removed during the fall and winter season. In addition, the preferred design of the stakes allows the user to leave the stakes in the ground year round, thereby facilitating reassembly of the extendable gardening trellis during the next gardening season. Thus, the trellis is limited in exposure to the elements when not in use during the growing season. In this way, the present invention lasts longer then typical support devices in the market which remain assembled outdoors year round. Furthermore, by using the present invention, an unsightly and bare frame may be dissembled and placed away conveniently, rather then left standing outside during the winter months.

The invention is described in detail with reference to a particular embodiment, but it should be understood that various other modifications can be effected and still be within the spirit and scope of the invention.

We claim:

1. An extendable garden trellis comprising:
   (a) an upper portion comprising upper side rails perpendicularly attached to an upper cross piece by upper fastening brackets, said upper side rails having a top portion and a bottom portion, said upper fastening brackets attaching the distal ends of said upper cross piece to the top portion of said upper side rails, said upper fastening brackets having a top leg perpendicularly attached to a bottom leg, said top leg having a continuous channel thorough said top leg, said bottom leg having a channel, whereby the distal ends of said upper cross piece are inserted into the channels of said top leg of said upper fastening brackets and said top portion of said upper side rails is inserted into said channel of said bottom leg to attach said top portion of said upper side rails to said upper cross piece;
   (b) a lower portion comprising lower side rails perpendicularly attached to a lower cross piece by lower fastening brackets, said lower side rails having a channel, a top portion and a bottom portion, said lower fastening brackets attaching the distal ends of said lower cross piece to the lower portions of said lower side rails, said lower fastening brackets having a top leg perpendicularly attached to a bottom leg, said top leg having a continuous channel, said bottom leg having a channel, whereby the distal ends of said lower cross piece are inserted into the channel of said top leg of said lower fastening bracket and said bottom portion of said lower side rails is inserted into said channel of said bottom leg to attach said bottom portion of said lower side rails to said lower cross piece, and said upper side rails of said upper tube portion being inserted into the channel of said lower side rails of said lower tube portion to form a frame assembly;
   (c) a support means spread across said frame assembly for suspension of plants from said frame assembly; and
   (d) an attachment means for attaching said frame assembly to the ground perpendicular to the ground surface.

2. An extendable garden trellis according to claim 1, whereby said support means comprises a mesh netting spread across said frame assembly and perpendicular the ground surface, said mesh netting being fastened to said upper and lower side rails, said cross pieces and said lower and upper fastening brackets.

3. An extendable garden trellis according to claim 1, whereby said attachment means comprises stakes having an upper neck and a body defined by four fins and a tip, said upper neck being inserted into the channel of said lower side rails.

4. An extendable garden trellis according to claim 2, whereby said attachment means comprises stakes having an upper neck and a body defined by four fins and a tip, said upper neck being inserted into the channel of said lower side rails.

5. An extendable garden trellis according to claim 1, wherein said bottom portion of said upper side rails include a plurality of apertures evenly spaced along the length and said top portion of said lower side rails have an aperture, whereby, when the upper side rails are inserted into the channel of said lower side rails, said apertures align; and, further comprising a coupling means inserted through the apertures for connecting said upper and lower side rails.

6. An extendable garden trellis according to claim 2, wherein said bottom portion of said upper side rails include a plurality of apertures evenly spaced along the length and said top portion of said lower side rails have an aperture, whereby, when the upper side rails are inserted into the channel of said lower side rails, said apertures align; and, further comprising a coupling means inserted through the apertures for connecting said upper and lower side rails.

7. An extendable garden trellis according to claim 3, wherein said bottom portion of said upper side rails include a plurality of apertures evenly spaced along the length and said top portion of said lower side rails have an aperture, whereby, when the upper side rails are inserted into the channel of said lower side rails, said apertures align; and, further comprising a coupling means inserted through the apertures for connecting said upper and lower side rails.

8. An extendable garden trellis according to claim 4, wherein said bottom portion of said upper side rails include a plurality of apertures evenly spaced along the length and said top portion of said lower side rails have an aperture, whereby, when the upper side rails are inserted into the channel of said lower side rails, said apertures align; and, further comprising a coupling means inserted through the apertures for connecting said upper and lower side rails.

9. An extendable garden trellis according to claim 3, wherein said upper neck of said stake includes an aperture and said lower portion of said lower side rails have an aperture, whereby, when the upper neck of said stake is inserted into the channel of said lower side rails, the apertures align; and, further comprising a coupling means to connect said stakes to said lower side rails.

10. An extendable garden trellis according to claim 1, wherein said upper and lower fastening brackets include an aperture in said top leg and in said lower leg; and, further comprising a connecting means to secure said fastening brackets to said upper and lower side rails and said upper and lower cross pieces.

11. An extendable garden trellis comprising:
    (a) an upper portion comprising upper side rails perpendicularly attached to an upper cross piece by upper fastening brackets, said upper side rails having a top portion and a bottom portion, said upper fastening brackets attaching the distal ends of said upper cross piece to the top portion of said upper side rails;
    (b) a lower portion comprising lower side rails perpendicularly attached to a lower cross piece by lower fastening brackets, said lower side rails having a channel, a top portion and a bottom portion, said lower fastening brackets attaching the distal ends of said lower cross piece to the lower portion of said lower side rails, said bottom portion of said upper side rails of said upper portion being inserted into the channel of said lower side rails of said lower portion to form a frame assembly;

(c) a support means spread across said frame assembly for suspension of plants from said frame assembly; and (d) an attachment means for attaching said frame assembly to the ground perpendicular to the ground surface.

12. An extendable garden trellis according to claim 11, wherein said bottom portion of said upper side rails include apertures evenly spaced along the length and said top portion of said lower side rails include an aperture, whereby, when the upper side rails are inserted into the channel of said lower side rails, said apertures align; and, further comprising a coupling means inserted through the apertures for connecting said upper portion to said lower portion.

13. An extendable garden trellis according to claim 11, whereby said attachment means comprises stakes having an upper neck and a body defined by four fins and a tip, said upper neck being inserting into the channel of said lower side rails.

14. An extendable garden trellis according to claim 11, whereby said support means comprises a mesh netting spread across said frame assembly, said mesh netting being fastened to said upper and lower side rails, said cross pieces and said lower and upper fastening brackets.

* * * * *